US009925868B2

(12) United States Patent
Palazzolo et al.

(10) Patent No.: US 9,925,868 B2
(45) Date of Patent: Mar. 27, 2018

(54) TRANSFER CASE FOR AN AUTOMOTIVE POWERTRAIN SYSTEM

(71) Applicant: BorgWarner Inc., Auburn Hills, MI (US)

(72) Inventors: Michael R. Palazzolo, Madison Heights, MI (US); Jesse Jongebloed, Clawson, MI (US)

(73) Assignee: BorgWarner Inc., Auburn Hills, MI (US)

( * ) Notice: Subject to any disclaimer, the term of this patent is extended or adjusted under 35 U.S.C. 154(b) by 366 days.

(21) Appl. No.: 14/868,563

(22) Filed: Sep. 29, 2015

(65) Prior Publication Data

US 2016/0101688 A1   Apr. 14, 2016

Related U.S. Application Data

(60) Provisional application No. 62/061,976, filed on Oct. 9, 2014.

(51) Int. Cl.
*F16H 37/06* (2006.01)
*B60K 17/344* (2006.01)
*B60K 17/35* (2006.01)
*F16H 57/04* (2010.01)

(52) U.S. Cl.
CPC ....... *B60K 17/344* (2013.01); *F16H 57/0428* (2013.01); *F16H 57/0473* (2013.01); *F16H 57/0483* (2013.01); *B60K 17/35* (2013.01)

(58) Field of Classification Search
CPC . B60K 17/35; F16H 57/0428; F16H 57/0473; F16H 57/0483

USPC ...................................................... 74/665 G
See application file for complete search history.

(56) References Cited

U.S. PATENT DOCUMENTS

| | | | | |
|---|---|---|---|---|
| 5,092,188 A | * | 3/1992 | Fujikawa | B60K 23/0808 180/249 |
| 5,655,986 A | * | 8/1997 | Wilson | B60K 17/3467 180/248 |
| 5,704,867 A | * | 1/1998 | Bowen | B60K 17/3462 475/205 |
| 6,022,289 A | * | 2/2000 | Francis | B60K 17/3467 475/204 |
| 6,251,045 B1 | | 6/2001 | Oliveira et al. | |
| 6,579,208 B2 | | 6/2003 | Oliveira et al. | |
| 7,278,943 B2 | | 10/2007 | Puiu | |

\* cited by examiner

*Primary Examiner* — Ha Dinh Ho
(74) *Attorney, Agent, or Firm* — Howard & Howard Attorneys PLLC

(57) ABSTRACT

A transfer case (16) for translating torque from an engine (12) to first and second differentials (20, 22), including: a housing (42), a primary shaft (44) supported in the housing (42) with an input end (52) in communication with the engine (12) and an output end (54) in communication with the first differential (20), a secondary shaft (46) spaced from the primary shaft (44) and in communication with the second differential (22), a clutch assembly (48) in communication with the shafts (44, 46) for selectively translating torque therebetween, and a sleeve (50) operatively attached to the primary shaft (44) between ends (52, 54). The sleeve (50) has an outer surface (68) with a plurality of radially spaced flutes (70) defined therein for directing lubricant from a predetermined location (72) of the housing (42) toward the clutch assembly (48) during rotation of the primary shaft (44).

20 Claims, 9 Drawing Sheets

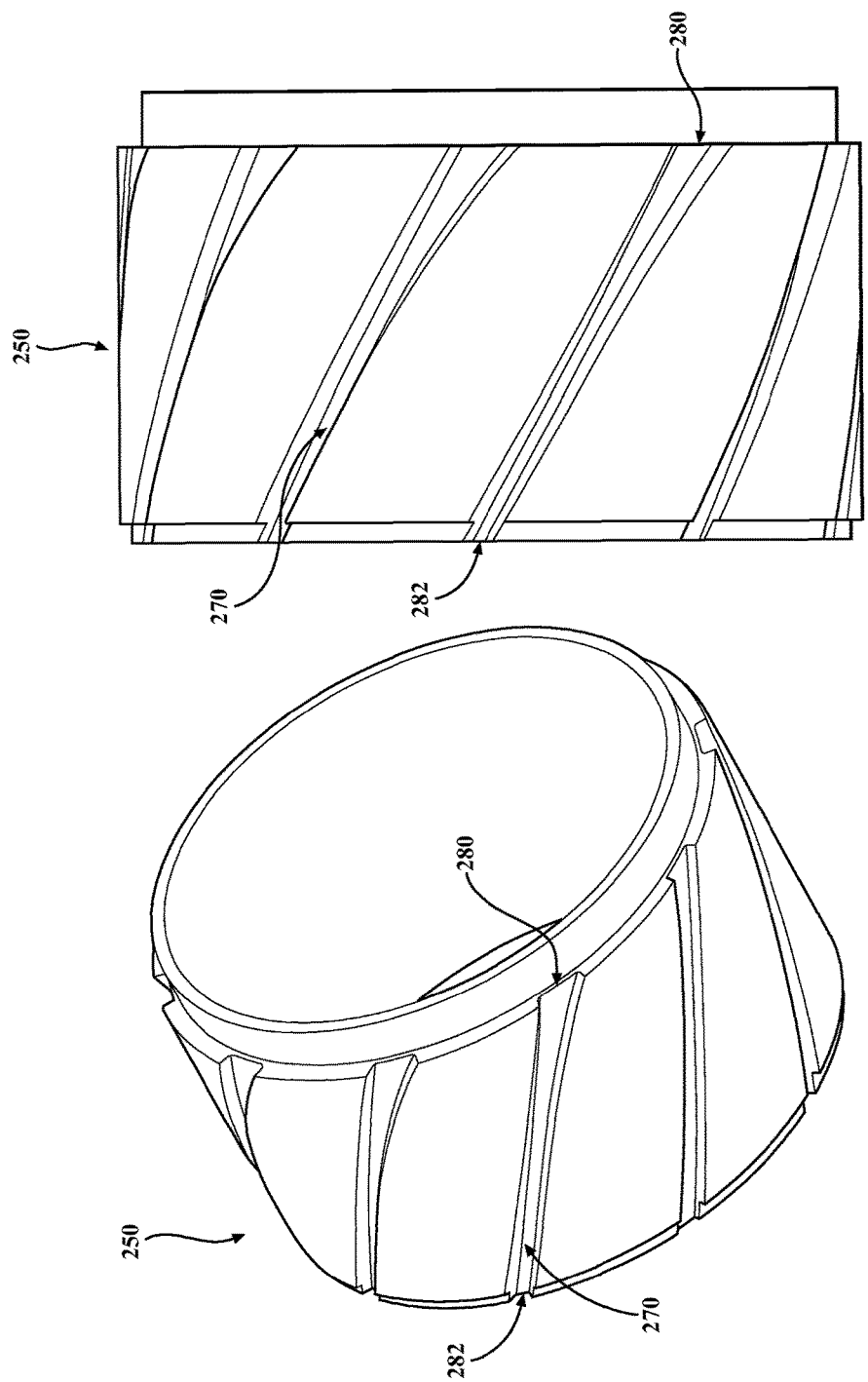

TRANSFER CASE FOR AN AUTOMOTIVE POWERTRAIN SYSTEM

CROSS-REFERENCE TO RELATED APPLICATIONS

The present application claims priority to and all the benefits of U.S. Provisional Patent Application No. 62/061,976, filed on Oct. 9, 2014, which is hereby expressly incorporated herein by reference in its entirety.

BACKGROUND OF INVENTION

1. Field of Invention

The present invention relates generally to automotive powertrain systems and, more specifically, to a transfer case for an automotive powertrain system.

2. Description of the Related Art

Conventional automotive four-wheel-drive systems known in the art typically include an internal combustion engine that outputs rotational torque to a transmission which, in turn, adjusts the rotational speed and torque. The transmission subsequently translates rotational torque to a transfer case which, in turn, is configured to selectively translate rotational torque to a rear differential in rear-wheel-drive mode, or to both the rear differential and a front differential in four-wheel-drive mode. To that end, transfer cases typically include a housing supporting a series of shafts, gears, chains, clutches, and linkages which cooperate to effect selectable translation of rotational torque to the differentials. The transfer case is typically lubricated with oil and may include a pump assembly configured to transfer oil to the various shafts, gears, chains, clutches, and linkages in operation. Depending on the application, the transfer case may alternatively be designed without a pump assembly, whereby oil is transferred throughout the housing via windage forces generated by movement of the shafts, gears, and/or chains.

Each of the components of transfer cases of the type described above must cooperate to effectively selectively translate rotation from the transmission to the differentials. In addition, each of the components must be designed not only to facilitate improved performance and efficiency, but also so as to reduce the cost and complexity of manufacturing the transfer case. While transfer cases known in the related art have generally performed well for their intended use, there remains a need in the art for a transfer case that has superior operational characteristics, a reduced overall packaging size, reduced parasitic losses, increased efficiency and, at the same time, that reduces the cost and complexity of manufacturing the components of the transfer case.

SUMMARY OF THE INVENTION

The present invention overcomes the disadvantages in the related art in a transfer case for translating rotational torque from an engine to first and second differentials of a vehicle. The transfer case includes a housing, a primary shaft, a secondary shaft, a clutch assembly, and a sleeve. The primary shaft is rotatably supported in the housing and has an input end in rotational communication with the engine and an output end in rotational communication with the first differential. The secondary shaft is spaced from the primary shaft and is in rotational communication with the second differential. The clutch assembly is in communication with the primary shaft and the secondary shaft and is used to selectively translate rotational torque therebetween. The sleeve is operatively attached to the primary shaft between the input end and the output end. The sleeve has an outer surface with a plurality of radially spaced flutes defined therein for directing lubricant from a predetermined location of the housing toward the clutch assembly during rotation of the primary shaft.

In this way, the transfer case of the present invention significantly minimizes parasitic losses in operation while facilitating optimized lubrication of the clutch assembly. Moreover, the transfer case reduces the cost and complexity of manufacturing powertrain systems that have superior operational characteristics, such as high efficiency, improved packaging and ground clearance, and improved life.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 6A is a perspective view of the sleeve of FIG. 3 in a third embodiment.

FIG. 6B is a top plan view of the sleeve of FIG. 6A.

DETAILED DESCRIPTION OF THE INVENTION

Figure 1:
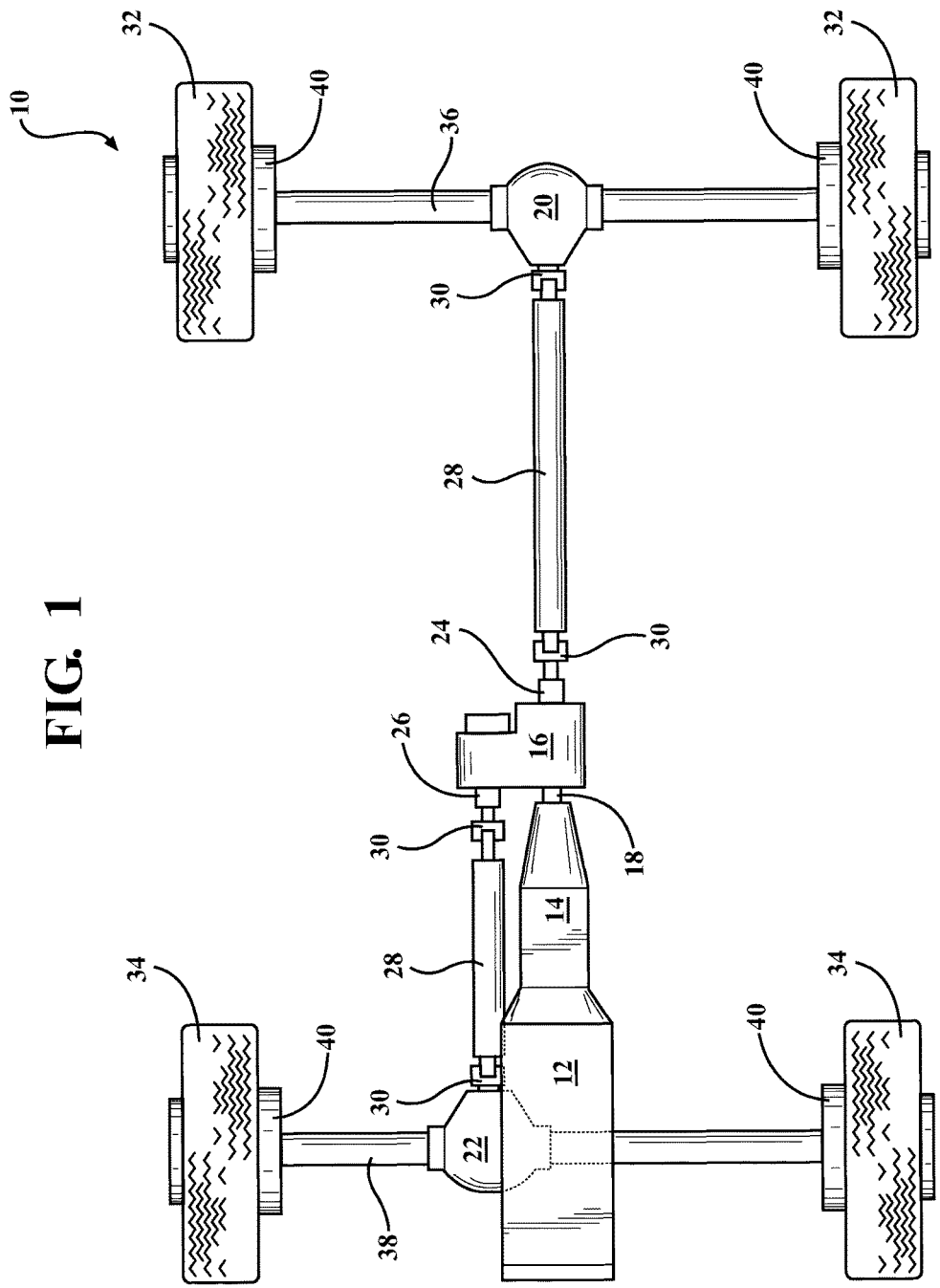
FIG. 1 is a schematic plan view of a drivetrain of a four-wheel-drive automobile, including a transfer case, according to one embodiment of the present invention.

Referring now to the figures, where like numerals are used to designate like structure, a portion of a drivetrain of a vehicle is schematically illustrated at 10 in FIG. 1. The drivetrain 10 includes an internal combustion engine 12, a transmission 14, and a transfer case 16. The engine 12 produces rotational torque and is in rotational communication with the transmission 14 which, in turn, adjusts the rotational speed and torque which is subsequently used to drive the vehicle, as described in greater detail below. Those having ordinary skill in the art will appreciate that transmission 14 can be designed in several different ways and, as such, can be in rotational communication with the engine 12 in any suitable way depending on the application, without departing from the scope of the present invention. By way of non-limiting example, the transmission 14 could include a set of discreet gears (not shown, but generally known in the art) that are either manually or automatically actuated, or the transmission 14 could be continuously variable. Moreover, while FIG. 1 shows the engine 12 and transmission 14 operatively attached to one another, those having ordinary skill in the art will appreciate that the transmission 14 could spaced from the engine 12, so as to improve weight distribution of the vehicle drivetrain 10, without departing from the scope of the present invention.

The transmission 14 is also in rotational communication with the transfer case 16, and translates the adjusted rotational torque thereto. In the representative embodiment illustrated herein, the transfer case 16 is situated in-line with and adjacent to the transmission 14, and is in rotational communication therewith via a transmission output shaft 18. However, those having ordinary skill in the art will appreciate that the transfer case 16 and transmission 14 could be in rotational communication with each other in other ways. Specifically, it will be appreciated that the transmission 14 and transfer case 16 could be offset from one another and could be in rotational communication via an intermediate shaft with one or more universal joints (not shown, but generally known in the art), thereby enabling additional flexibility with respect to weight distribution and packaging of the vehicle drivetrain 10. Similarly, the transfer case 16 could be integrated with or otherwise formed as a part of the transmission 14, without the use of a discrete transmission output shaft 18, without departing from the scope of the present invention.

The transfer case 16 is configured to selectively translate rotational torque to a first differential 20, such as in rear-wheel-drive mode, or to both the first differential 20 and a second differential 22, such as in four-wheel-drive mode. Those having ordinary skill in the art will appreciate that the transfer case 16 could be selectively switched from rear-wheel-drive mode to four-wheel-drive mode in a number of different ways, such as with mechanical levers or electronically-controlled actuators, without departing from the scope of the present invention. The transfer case 16 includes a first output 24 and a second output 26 in rotational communication with the first differential 20 and the second differential 22, respectively. A pair of driveshafts 28 with one or more universal joints 30 connect the outputs 24, 26 of the transfer case 16 to the differentials 20, 22 so as to translate rotational torque thereto. The differentials 20, 22 are each in rotational communication with a respective pair of wheels and tires 32, 34 and translate rotational torque to the wheels and tires 32, 34 so as to drive the vehicle in operation. In the representative embodiment illustrated herein, the differentials 20, 22 are carried by respective axle assemblies 36, 38 having hubs, generally indicated at 40, to which the wheels and tires 32, 34 are mounted. However, those having ordinary skill in the art will appreciate that there are a number of different ways that the differentials 20, 22 could translate rotational torque to the wheels and tires 32, 34, depending on the application.

Figure 2:
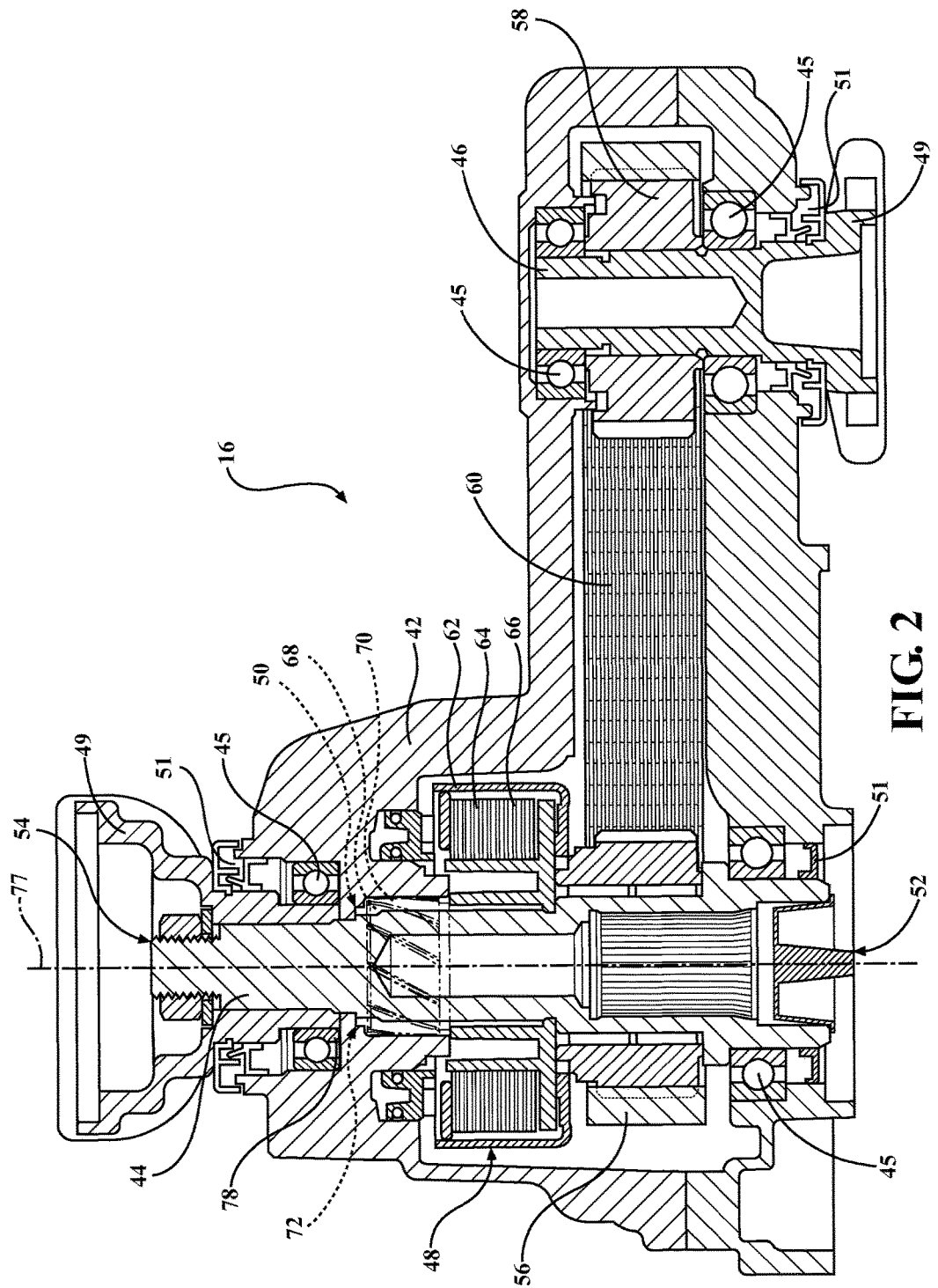
FIG. 2 is a cross-sectional view of a transfer case, according to one embodiment of the present invention.

Referring now to FIG. 2, a cross-sectional view of a transfer case 16 of the type described above is shown. More specifically, FIG. 2 illustrates a transfer case 16 for translating rotational torque from the engine 12 to first and second differentials 20, 22 of a vehicle drivetrain 10. The transfer case 16 includes a housing 42 a primary shaft 44, a secondary shaft 46, a clutch assembly 48, and a sleeve 50. Each of these components will be described in greater detail below.

The primary shaft 44 is rotatably supported in the housing 42 and has an input end 52 in rotational communication with the engine 12, and an output end 54 in rotational communication with the first differential 20. Similarly, the secondary shaft 46 is in rotational communication with the second differential 22. Thus, the first output 24 of the transfer case 16 is defined by rotation of the primary shaft 44, and the second output 26 of the transfer case 16 is defined by rotation of the secondary shaft 46. The shafts 44, 46 are supported by a set of ball bearings, generally indicated at 45, that are operatively attached in the housing 42. However, those having ordinary skill in the art will appreciate that the shafts 44, 46 could be rotatably supported in other ways, with or without the use of ball bearings 45, without departing from the scope of the present invention.

Each of the shafts 44, 46 may include a respective coupling 49 operatively attached adjacent to the outputs 24, 26 for connecting to the driveshafts 28, as discussed above. However, those having ordinary skill in the art will appreciate that the shafts 44, 46 of the transfer case 16 could be connected to the driveshafts 28 in other ways without departing from the scope of the present invention. Moreover, each of the shafts 44, 46 may include one or more seals, generally indicated at 51, disposed adjacent to the couplings 52, 54.

The secondary shaft 46 is spaced from the primary shaft 44 and is rotatably supported in the housing 42. As best in FIG. 2, the primary shaft 44 and secondary shaft 46 each include respective sprockets 56, 58 connected to one another by an endless chain 60. The chain 60 is used to selectively translate rotational torque from the primary shaft 44 to the secondary shaft 46. However, it will be appreciated that rotational torque could be translated between the shafts 44, 46 in other ways, with or without the use of a chain 60, without departing from the scope of the present invention. By way of non-limiting example, a gear set (not shown, but generally known in the art) could be utilized in the place of the chain 60.

The clutch assembly 48 is in communication with both the primary shaft 44 and the secondary shaft 46 and is used to selectively translate rotational torque therebetween. In one embodiment, the clutch assembly 48 is radially supported on the primary shaft 44 and can be modulated so as to translate rotational torque to the primary shaft sprocket 56 which, in turn, is translated via the chain 60 to the secondary shaft sprocket 58 and secondary shaft 46. The clutch assembly 48 includes a clutch body 62 with a plurality of stacked plates 64 and clutch discs 66 disposed therein. The plates 64 and clutch discs 66 cooperate to effect translation of rotational torque to the secondary shaft sprocket 58 when the clutch assembly 48 is modulated. To that end, an actuator (not show, but generally known in the art) may be used to modulate the clutch assembly 48 so as to smooth the transition between engagement and disengagement of the second differential 22. It will be appreciated that heat is generated during modulation of the clutch assembly 48, as friction occurs between the plates 64, clutch discs 66, and clutch body 62 in operation.

As noted above, the transfer case 16 of the present invention also includes a sleeve 50, which is operatively attached to the primary shaft 44 between the input end 52 and the output end 54. Those having ordinary skill in the art will appreciate that the sleeve 50 can be operatively attached to the primary shaft 44 in a number of different ways without departing from the scope of the present invention. By way of non-limiting example, the sleeve 50 could be fixed to and rotate with the primary shaft 44; could be supported by and rotate independent of the primary shaft 44; or could be integrated with or otherwise formed as a part of the primary shaft 44.

Figure 3:
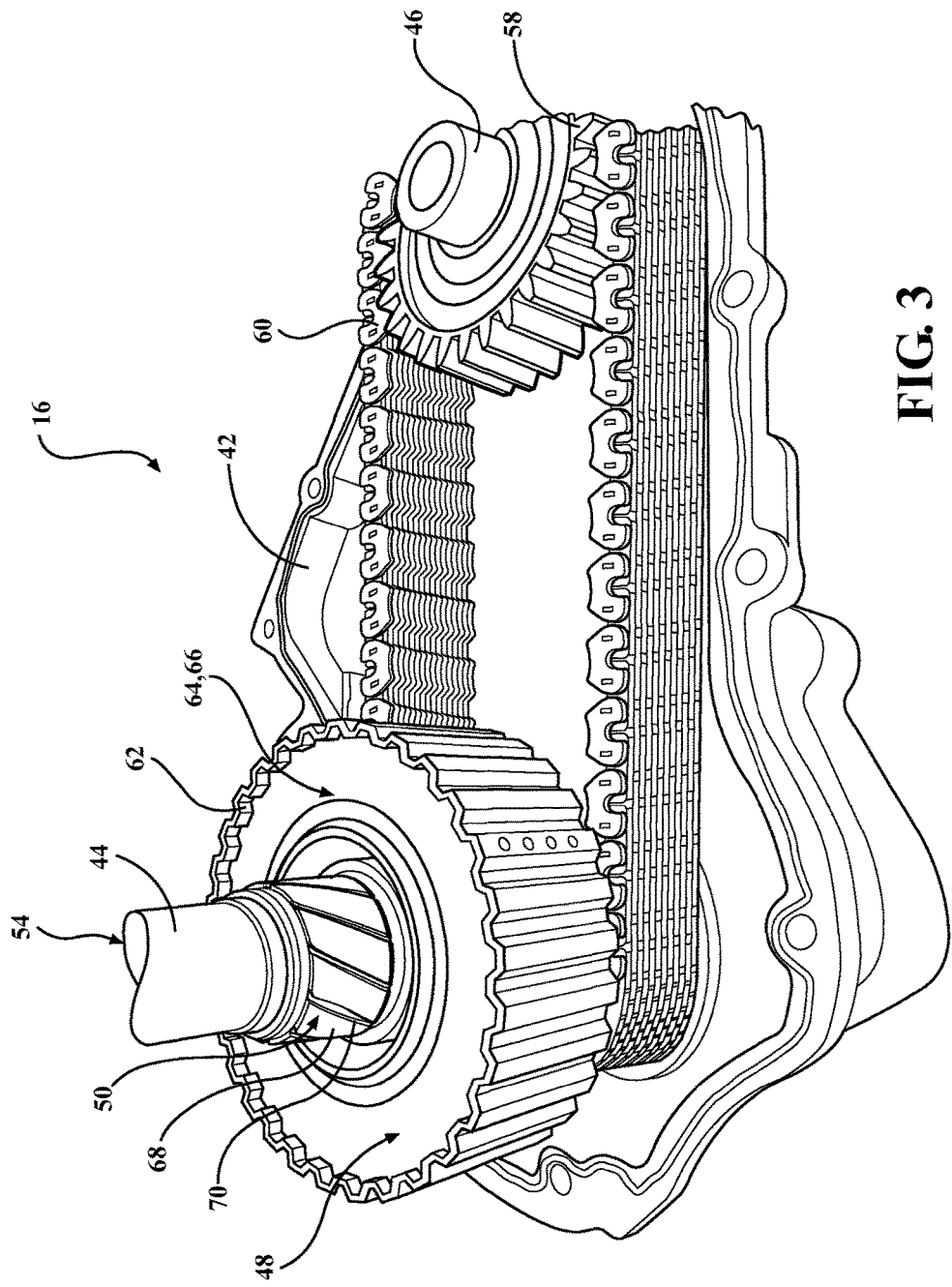
FIG. 3 is a perspective view of the transfer case of FIG. 2 in a partially disassembled state, showing a sleeve according to one embodiment of the present invention.

As shown best in FIG. 3, the sleeve 50 is disposed between the clutch assembly 48 and the output end 54 of the primary shaft 44. However, it will be appreciated that the sleeve 50 could be spaced differently along the primary shaft 44 without departing from the scope of the present invention. The sleeve 50 has an outer surface 68 with a plurality of radially spaced flutes 70 defined therein for directing lubricant from a predetermined location, generally indicated at 72, of the housing 42 (see FIG. 2) toward the clutch assembly 48 during rotation of the primary shaft 44 in operation. As shown in FIG. 4C, the sleeve 50 has a total of ten flutes 70 defined therein. However, those having ordinary skill in the art will appreciate that any suitable number of flutes 70 could be used without departing from the scope of the present invention.

It will be appreciated that the flutes 70 of the sleeve 50 of the transfer case 16 of the present invention can be configured in a number of different ways depending on the specific application of the transfer case 16, without departing from the scope of the present invention. For example, vehicles having different sizes, weights, or intended uses may likewise utilize transfer cases 16 having different sizes, oil volumes, rotational speeds, clutch assembly 48 sizes or configurations, and the like. Thus, the benefits afforded by the transfer case 16 of the present invention can be optimized by adjusting the configuration of the flutes 70, as described in greater detail below. By way of non-limiting example, five different embodiments of the sleeve 50 are described herein, each having differently configured flutes 70.

Figure 4B:
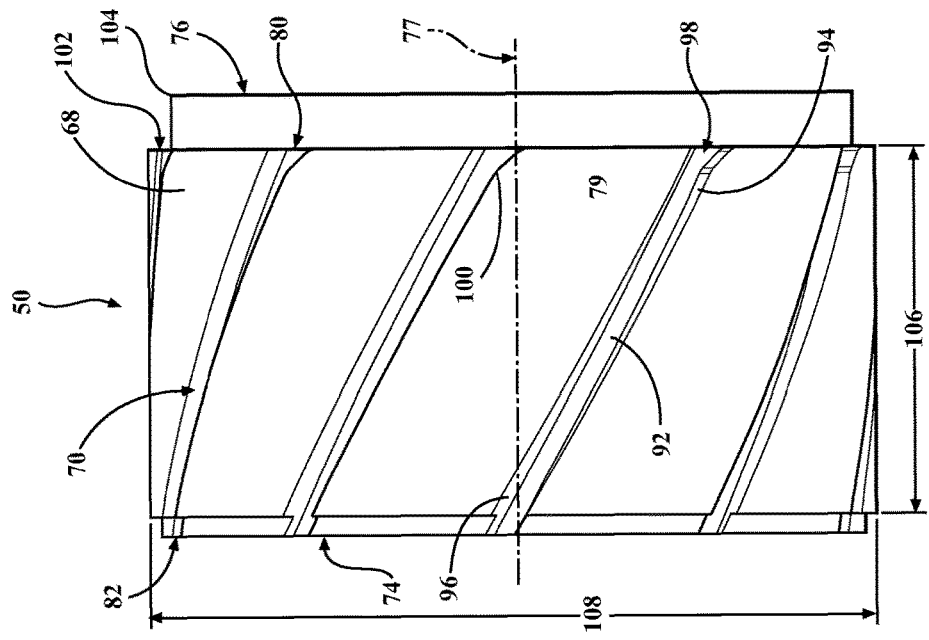
FIG. 4B is a top plan view of the sleeve of FIG. 4A.
Figure 4A:
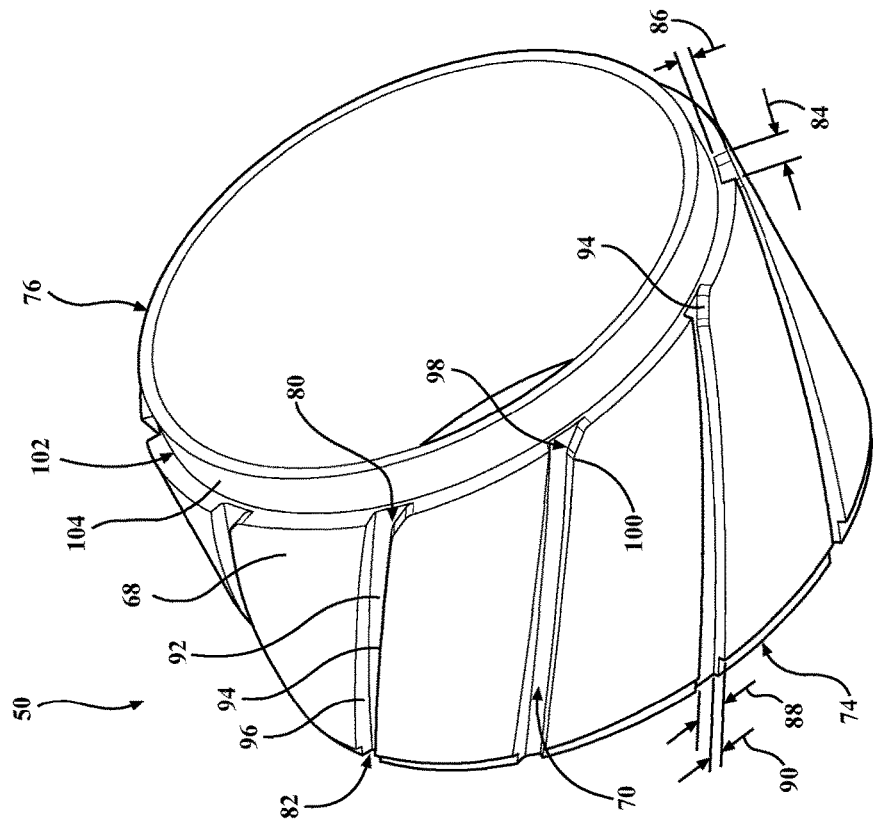
FIG. 4A is a perspective view of the sleeve of FIG. 3 in a first embodiment.
Figure 4C:
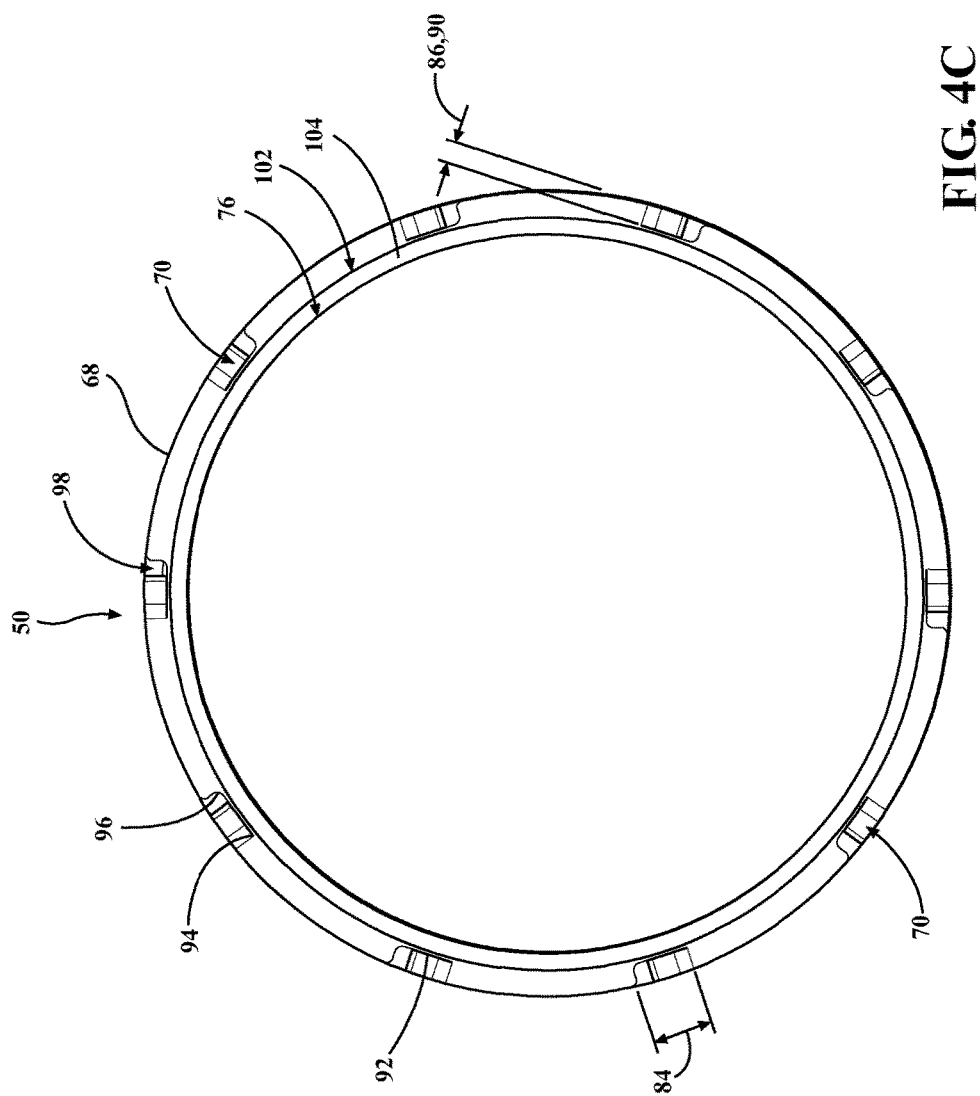
FIG. 4C is a front side plan view of the Sleeve of FIGS. 4A and 4B.

Referring now to FIGS. 4A-4C, the first embodiment of the sleeve 50 is shown. The sleeve 50 has an output side 74 and an opposing inlet side 76. The inlet side 76 is disposed adjacent to the predetermined location 72 of the housing 42. Similarly, the output side 74 is disposed adjacent to the clutch assembly 48. The predetermined location 72 of the housing 42 may be further defined as an oil port 78 (see FIG. 2) formed in the housing 42 adjacent to the inlet side 76 of the sleeve 50. However, it will be appreciated that the inlet side 76 and output side 74 of the sleeve 50 could be oriented or disposed differently with respect to any suitable part of the transfer case 16 without departing from the scope of the present invention.

As shown in FIG. 4B, a reference axis 77 is defined with respect to the primary shaft 44. The flutes 70 are defined helically at a helix angle 79 with respect to the axis 77. The substantially helical profile of the flutes 70 helps promote translation of oil therealong. However, those having ordinary skill in the art will appreciate that the flutes 70 could have any suitable profile, radially spaced about the outer surface 68 of the sleeve 50, without departing from the scope of the present invention. Advantageously, the helix angle 79 is less than 60-degrees, and particularly less than 35-degrees, so as to minimize the complexity of manufacturing the sleeve 50 and, at the same time, optimize the promotion of oil translation by the flutes 70. In the first embodiment of the sleeve 50 shown in FIGS. 4A-4C, the helix angle 79 is approximately 30-degrees.

The flutes 70 each extend from an inlet portion 80 adjacent to the inlet side 76 of the sleeve 50, to an output portion 82 adjacent to the output side 74 of the sleeve 50. The inlet portion 80 has a first width 84 and a first depth 86, and the output portion 82 has a second width 88 and a second depth 90 (see FIG. 4A). The flutes 70 have a floor 92 spaced from the outer surface 86 of the sleeve 50, and first and second walls 94, 96 extending from the floor 92 to the outer surface 86. While the inlet portion 80 and the output portion 82 both have a substantially partially rectangular upwardly-opening profile, those having ordinary skill in the art will appreciate that the portions 80, 82 could have a profile of any suitable shape or configuration, such as a U-shaped profile, with the flutes 70 having the same or different profiles from one another, without departing from the scope of the present invention. Advantageously, a first ratio between the first width 84 and the first depth 86 of the inlet portion 80 is greater than 1:1. Similarly, a second ratio between the second width 88 and the second depth 90 of the output portion 82 is also greater than 1:1. Thus, the flutes 70 are wider than they are deep, which promotes translation of lubricant therealong, as noted above. In the first embodiment illustrated in FIGS. 4A-4C, the second ratio is approximately 1.4:1.

As shown best by FIG. 4C, the first depth 86 of the inlet portion 80 is substantially equal to the second depth 90 of the output portion 82 and, thus, the flutes 70 have a substantially constant depth between the portions 80, 82. However, it will be appreciated that the depths 86, 90 of the flutes 70 could be different from one another, such that the floor may taper or otherwise transition between the first depth 86 and the second depth 90, without departing from the scope of the present invention.

The first width 84 is greater than the second width 88, thereby defining neck portions 98 of the flutes 70 adjacent the inlet side 76 of the sleeve 50. The flutes 70 have a substantially constant width (the second width 88) from the output portion 82 to the neck portion 98. The neck portions 98 have a tapered profile and merge with the flutes 70 at a merging point 100 (See FIG. 4B). More specifically, the neck portions 98 may have an asymmetric profile defined by tapering of the first wall 94 of the flutes 70 between the inlet portion 80 and the merging point 100, and the second wall 96 of the flutes has a substantially constant profile defined between the inlet portion 80 and the output portion 82. However, it will be appreciated that both walls 94, 96 could taper such that the neck portion 98 of the flutes 70 could be configured differently, such as with a symmetric profile, without departing from the scope of the present invention. In the first embodiment illustrated in FIGS. 4A-4C, the neck portions 98 of the flutes 70 have a quickly tapering asymmetric profile.

The sleeve 50 may also include a step 102 defined in the outer surface 68 adjacent to the inlet portion 80. The step 102 defines a reduced portion 104 of the sleeve 50 where oil can pool from the predetermined location 72 of the housing 42, thereby promoting translation of oil to the flutes 70. The step 102 may be configured such that a distance 106 defined between the step 102 and the outlet side 74 of the sleeve 50 is less than an outer diameter 108 of the sleeve 50 (see FIG. 4B). However, those having ordinary skill in the art will appreciate that oil could be fed to the inlet portion 80 of the sleeve 50 in other ways, and, thus, the step 102 could be configured differently, or omitted entirely, without departing from the scope of the present invention.

Figure 5B:
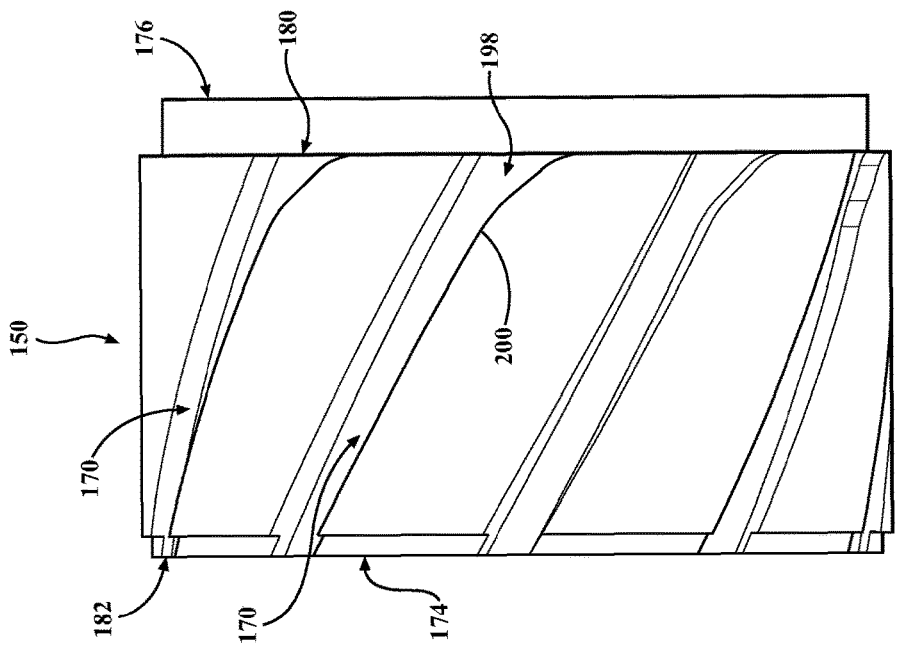
FIG. 5B is a top plan view of the sleeve of FIG. 5A.
Figure 5A:
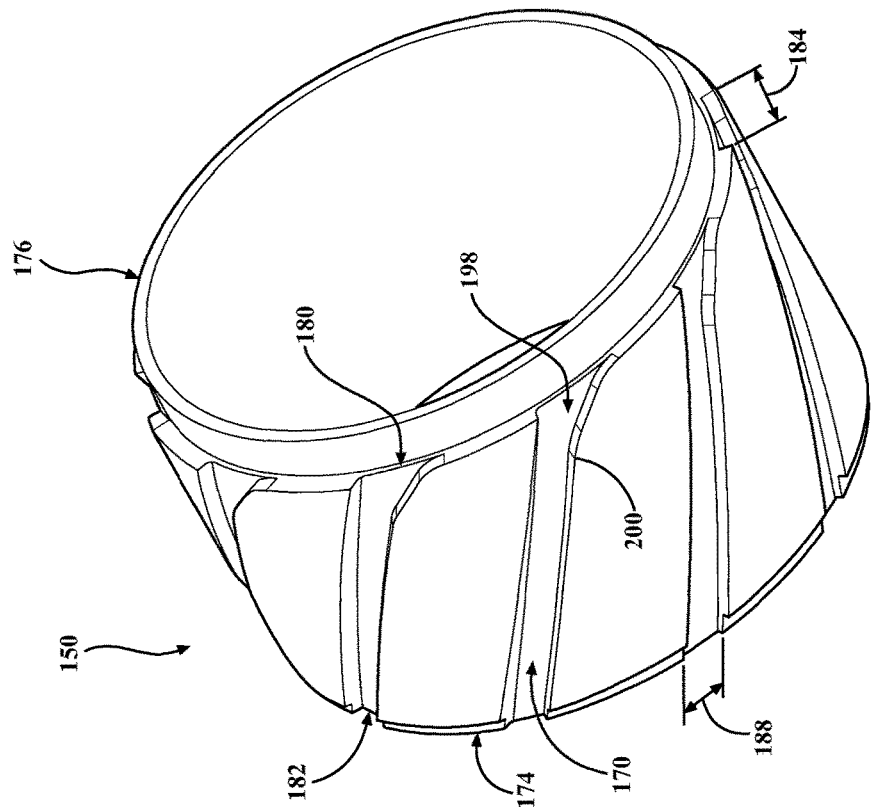
FIG. 5A is a perspective view of the sleeve of FIG. 3 in a second embodiment.

As noted above, a second embodiment of the sleeve 50 of the transfer case 16 of the present invention is shown in FIGS. 5A-5B. The second embodiment of the sleeve 50 is substantially similar to the first embodiment illustrated in FIGS. 4A-4C. Thus, in the description that follows, only the structure necessary to distinguish this embodiment will be described in detail. Moreover, like structure with respect to the first embodiment will be described with respect to the second embodiment using the same reference numerals increased by 100.

As shown best in FIG. 5B, in the second embodiment, the sleeve 150 has flutes 170 that are wider than the flutes 70 of the sleeve 50 of the first embodiment (compare to FIG. 4B).

More specifically, in the second embodiment, both the first width 184 of the inlet portion 180 and the second width 188 of the output portion 182 are wider than the first width 84 of the inlet portion 80 and the second width 88 of the output portion 82 of the first embodiment. Moreover, the second ratio between the second width 188 and the second depth 190 is approximately 2.6:1. Further, the neck portion 198 of the flutes 170 of the second embodiment of the sleeve 150 is also larger than the neck portion 98 of the flutes 70 of the first embodiment of the sleeve 50. More specifically, in the second embodiment, the merging point 200 is spaced closer to the output side 174 of the sleeve 150, giving the neck portion 198 a larger taper.

A third embodiment of the sleeve 50 of the transfer case 16 of the present invention is shown in FIGS. 6A-6B. The third embodiment of the sleeve 50 is substantially similar to the first embodiment illustrated in FIGS. 4A-4C. Thus, in the description that follows, only the structure necessary to distinguish this embodiment will be described in detail. Moreover, like structure with respect to the first embodiment will be described with respect to the second embodiment using the same reference numerals increased by 200.

As shown best in FIG. 6B, in the third embodiment, the sleeve 250 has flutes 270 that have a tapered profile from the inlet portion 280 to the output portion 282. Thus, unlike the flutes 70 of the first embodiment, the flutes 270 of the second embodiment do not have a discrete neck portion or merging point.

Figure 7B:
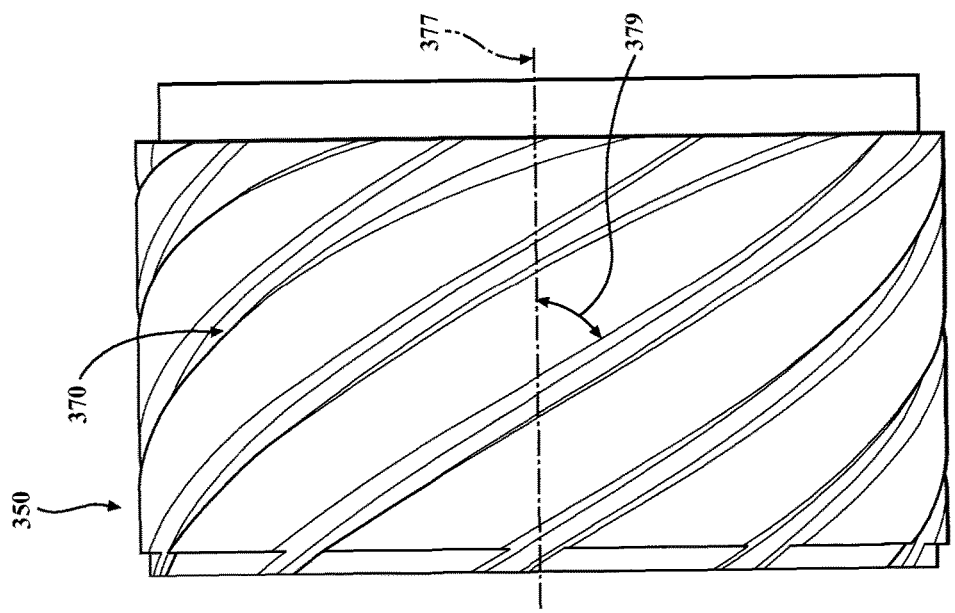
FIG. 7B is a top plan view of the sleeve of FIG. 7A.
Figure 7A:
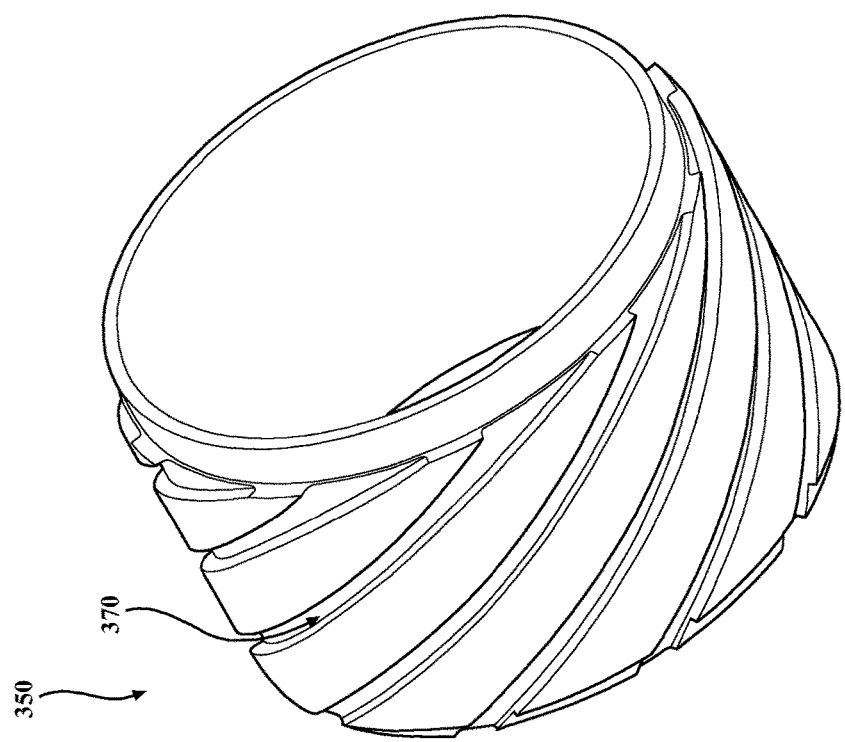
FIG. 7A is a perspective view of the sleeve of FIG. 3 in a fourth embodiment.

A fourth embodiment of the sleeve 50 of the transfer case 16 of the present invention is shown in FIGS. 7A-7B. The fourth embodiment of the sleeve 50 is substantially similar to the first embodiment illustrated in FIGS. 4A-4C. Thus, in the description that follows, only the structure necessary to distinguish this embodiment will be described in detail. Moreover, like structure with respect to the first embodiment will be described with respect to the second embodiment using the same reference numerals increased by 300.

As shown best in FIG. 7B, in the fourth embodiment, the flutes 370 of the sleeve 350 are disposed at a helix angle 379 of approximately 60-degrees, with respect to the axis 377.

Figure 8B:
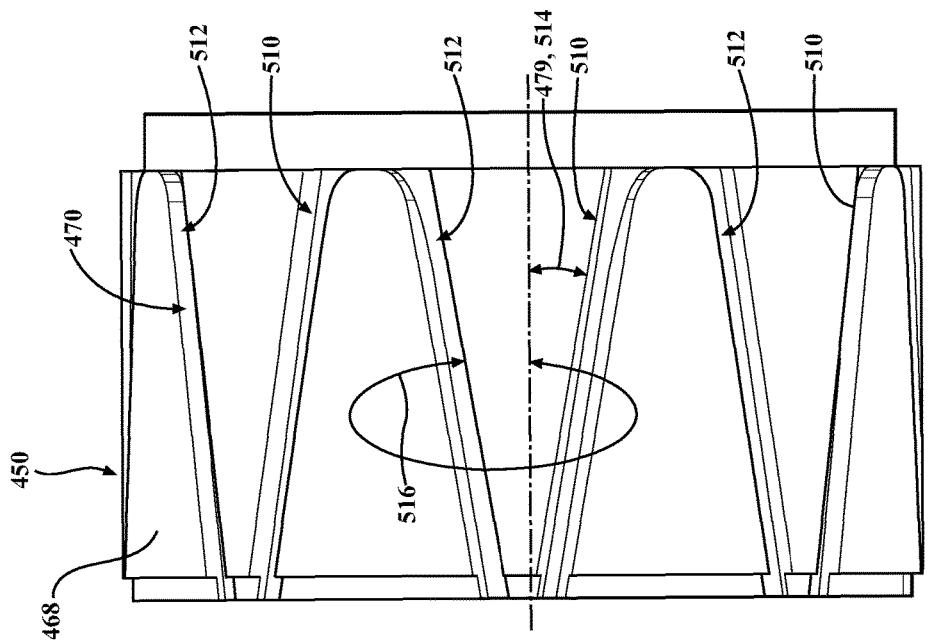
FIG. 8B is a top plan view of the sleeve of FIG. 8A.
Figure 8A:
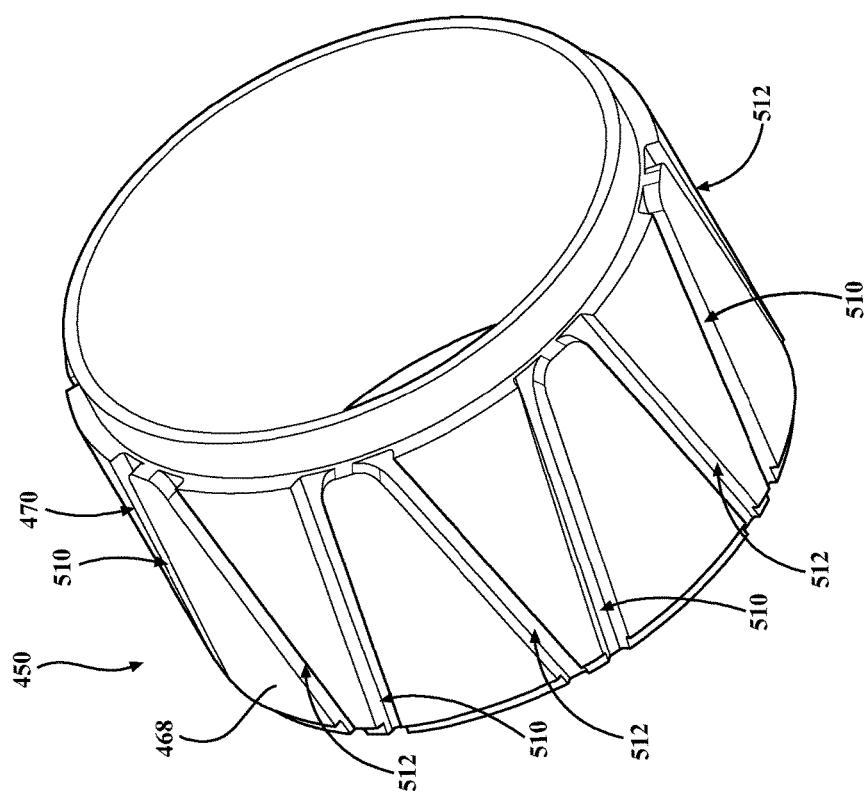
FIG. 8A is a perspective view of the sleeve of FIG. 3 in a fifth embodiment.

A fifth embodiment of the sleeve 50 of the transfer case 16 of the present invention is shown in FIGS. 8A-8B. The fifth embodiment of the sleeve 50 is substantially similar to the first embodiment illustrated in FIGS. 4A-4C. Thus, in the description that follows, only the structure necessary to distinguish this embodiment will be described in detail. Moreover, like structure with respect to the first embodiment will be described with respect to the second embodiment using the same reference numerals increased by 400.

As shown best in FIG. 8B, in the fifth embodiment, the plurality of radially spaced flutes 470 of the sleeve 450 are further defined as a first set of flutes 510. Similarly, the helix angle 479 is further defined as a first helix angle 514. Moreover, the outer surface 468 of the sleeve 45 includes a second set of flutes 512 defined helically at a second helix angle 516 defined with respect to the axis 477. Thus, the first set of flutes 510 and the second set of flutes 512 define a "double helix" arrangement. As shown in FIG. 8B, a sum of the first helix angle 514 and the second helix angle 516 is substantially equal to 360-degrees. However, those having ordinary skill in the art will appreciate that the first and second helix angles 514, 516 could be configured differently without departing from the scope of the present invention. Thus, while the first set of flutes 510 and the second set of flutes 512 do not intersect, it will be appreciated that the first set of flutes 510 and the second set of flutes 512 could intersect, merge, or otherwise interact without departing from the scope of the present invention.

In this way, it will be appreciated that the transfer case 16 of the present invention significantly minimizes parasitic losses and, at the same time, promotes translation of lubricating oil to the clutch assembly 48. Specifically, it will be appreciated that the transfer case 16 of the present invention can be oriented in a vehicle such that the flutes 70 of the sleeve 50 translate oil to the clutch assembly 48. Thus, parasitic losses are significantly minimized in that an oil pump need not be included in the transfer case 16 and, at the same time, oil can be translated to the clutch assembly 48 more effectively with the sleeve 50 than by windage forces. Moreover, it will be appreciated that the benefits afforded by the sleeve 50 allow the transfer case 16 to be designed to operate with a lower volume of oil and, thus, a lower overall packaging size. As such, it will be appreciated that the present invention reduces the cost and complexity of manufacturing transfer cases 16 that have superior operational characteristics, such as high efficiency, improved packaging and ground clearance, and improved performance and component life.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A transfer case for translating rotational torque from an engine to first and second differentials of an automotive powertrain system, said transfer case comprising:
   a housing;
   a primary shaft rotatably supported in said housing and having an input end in rotational communication with the engine and an output end in rotational communication with the first differential;
   a secondary shaft spaced from said primary shaft and in rotational communication with the second differential;
   a clutch assembly in communication with said primary shaft and said secondary shaft for selectively translating rotational torque therebetween; and
   a sleeve operatively attached to said primary shaft between said input end and said output end, said sleeve having an outer surface with a plurality of radially spaced flutes defined therein for directing lubricant from a predetermined location of said housing toward said clutch assembly during rotation of said primary shaft.

2. The transfer case as set forth in claim 1, wherein said sleeve has an output side and an opposing inlet side, said inlet side being disposed adjacent to said predetermined location of said housing.

3. The transfer case as set forth in claim 2, wherein said output side is disposed adjacent to said clutch assembly.

4. The transfer case as set forth in claim 2, wherein said predetermined location of said housing is further defined as an oil port formed in said housing adjacent said inlet side of said sleeve.

5. The transfer case as set forth in claim 2, wherein said flutes extend from an inlet portion adjacent said inlet side to an output portion adjacent said output side;
   said inlet portion having a first width and a first depth, and said output portion having a second width and a second depth.

6. The transfer case as set forth in claim 5, wherein said first depth is substantially equal to said second depth.

7. The transfer case as set forth in claim 5, wherein said first width is greater than said second width.

8. The transfer case as set forth in claim 7, wherein said flutes have a tapered profile from said inlet portion and said output portion.

9. The transfer case as set forth in claim 7, wherein said flutes have a neck portion adjacent said inlet side and a substantially constant width from said output portion to said neck portion.

10. The transfer case as set forth in claim 5, wherein a ratio between said first width and said first depth is greater than 1:1.

11. The transfer case as set forth in claim 5, wherein a ratio between said second width and said second depth is greater than 1:1.

12. The transfer case as set forth in claim 5, further including a step defined in said outer surface of said sleeve adjacent to said inlet portion.

13. The transfer case as set forth in claim 12, wherein a distance defined between said step and said outlet side is less than an outer diameter of said sleeve.

14. The transfer case as set forth in claim 1, wherein an axis is defined with respect to said primary shaft and said flutes are defined helically at a helix angle with respect to said axis.

15. The transfer case as set forth in claim 14, wherein said helix angle is less than 60-degrees.

16. The transfer case as set forth in claim 14, wherein said helix angle is less than 35-degrees.

17. The transfer case as set forth in claim 14, wherein said plurality of radially spaced flutes is further defined as a first set of flutes, said helix angle is further defined as a first helix angle, and wherein said outer surface of said sleeve further includes a second set of flutes defined helically at a second helix angle with respect to said axis.

18. The transfer case as set forth in claim 17, wherein a sum of said first helix angle and said second helix angle is substantially equal to 360 degrees.

19. The transfer case as set forth in claim 1, wherein said clutch assembly is radially supported on said primary shaft.

20. The transfer case as set forth in claim 1, wherein said sleeve is disposed between said clutch assembly and said output end of said primary shaft.

* * * * *